United States Patent
Dulong et al.

(10) Patent No.: US 6,212,627 B1
(45) Date of Patent: Apr. 3, 2001

(54) SYSTEM FOR CONVERTING PACKED INTEGER DATA INTO PACKED FLOATING POINT DATA IN REDUCED TIME

(75) Inventors: Carole Dulong, Saratoga, CA (US); Roger A. Golliver, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/170,365

(22) Filed: Oct. 12, 1998

(51) Int. Cl.[7] ................................................ G06F 9/302
(52) U.S. Cl. ............................................. 712/222; 708/495
(58) Field of Search ................................. 712/222, 221; 708/495

(56) References Cited

U.S. PATENT DOCUMENTS 5,892,960 * 4/1999 Seide ......................................... 712/7
5,995,122 * 11/1999 Hsieh et al. .......................... 712/222

OTHER PUBLICATIONS

Goldman, Gary et al., UltraSPARC–II(tm): The Advancement of UltraComputing, IEEE, 1996.*

Lee, Ruby et al., 64–bit and Multimedia Extensions in the PA–RISC 2.0 Architecture, IEEE, 1996.*

Shipnes, Julie, Graphics Processing with the 88110 RISC Microprocessor, IEEE 1992.*

Arakawa, Fumio, SH4 RISC Multimedia Microprocessor, IEEE Micro, 1998.*

* cited by examiner

*Primary Examiner*—Richard L. Ellis
(74) *Attorney, Agent, or Firm*—Blakely, Sokoloff, Taylor & Zafman LLP

(57) ABSTRACT

A method and apparatus for converting a packed integer data item having first and second data elements, to a packed floating-point data item. In one embodiment, a method includes moving the first data element of the integer data item to a first data element of a first intermediate data item and extending a sign of the first data element into all bit positions of a second data element of the first intermediate data item. The method further includes moving the second data element of the integer data item to a first data element of a second intermediate data item and extending a sign of the second data element into all bit positions of a second data element of the second intermediate data item. The first and second intermediate data items are converted from integer data items to respective floating-point data items, and the first and second intermediate floating-point data items are packed to first and second data elements of a result.

15 Claims, 5 Drawing Sheets

SYSTEM FOR CONVERTING PACKED INTEGER DATA INTO PACKED FLOATING POINT DATA IN REDUCED TIME

BACKGROUND OF THE INVENTION

1. Field of the Invention

The present invention relates generally to the field of computer systems, and specifically, to data manipulation instructions for enhancing value and efficiency of parallel instructions.

2. Background Information

To improve the efficiency of multimedia applications, as well as other applications with similar characteristics, a Single Instruction, Multiple Data (SIMD) architecture has been implemented in computer systems to enable one instruction to operate on several operands simultaneously, rather than on a single operand. In particular, SIMD architectures take advantage of packing many data elements within one register or memory location. With parallel hardware execution, multiple operations can be performed on separate data elements with one instruction, resulting in a significant performance improvement.

In many graphics applications, specifically three-dimensional ("3D") graphics applications, there are manipulation of scenes that have objects such as triangles and polygons, which are rotated, scaled, etc. The range of numbers in, for example, a thirty-two-bit register is from 0 to $2^{32}-1$. However, in many instances, the values of the objects may need to be represented by a floating-point number because a bigger number range is required or the number is not a whole number (e.g., due to introduction of angles). Therefore, these values must be converted to floating-point numbers and moved to the floating-point registers. Currently, to go from a SIMD packed integer data item to a SIMD packed floating-point data item, on the floating-point side (i.e., floating-point registers) of a processor, requires numerous instructions.

FIG. 1 illustrates a conventional technique of converting a SIMD packed integer data item to a SIMD packed floating-point data item. Referring to FIG. 1, a SIMD packed data item having integer data elements I1 and I2 are contained in a first floating-point register ("FR1"). The packed data item is transferred from FR1 to a first integer register ("IR1") on the integer side of the processor, in response to a first instruction (INST1). This is done because of the more robust instructions available on the integer side of the processor. Once on the integer side of the processor, the first data element I1 is placed in the lower order bits of a second integer register ("IR2") and the sign of I1 is extended in the higher order bits of IR2, in response to a second instruction (INST2). In response to a third instruction (INST3), IR1 is arithmetically shifted right from the higher order bits to the lower order bits, and the sign of I2 is shifted in the higher order bits.

In response to fourth and fifth instructions (INST4 and INST5), the data items contained in IR2 and IR1 are transferred to floating-point registers FR1 and FR2, respectively. The data items in FR1 and FR2 are now on the floating-point side of the processor. In response to sixth and seventh instructions (INST6 and INST7), the integer data items in FR1 and FR2 are converted to corresponding floating-point data items F1 and F2, in extended precision format (82 bits). The data items F1 and F2 are each represented by a mantissa (M1 and M2) and an exponent (E1 and E2). Responsive to eight and ninth instructions (INST8 and INST9), the data items F1 and F2 are stored in memory at locations A and A+1, respectively. The data items F1 and F2 are stored as single precision values (32 bits). In response to a tenth instruction (INST10), the data items stored in memory locations A and A+1 are loaded in FR1 (64 bits), providing a floating-point data item. As can be seen, the conversion of a SIMD packed integer to a SIMD packed float requires ten instructions, three of which are memory instructions. Memory instructions are very costly as compared to non-memory instructions. This conversion from SIMD packed integer to SIMD packed float may be required for thousands of data items in an application.

Accordingly, there is a need in the technology for a method and apparatus for reducing the number of instructions required to covert a SIMD packed integer to a SIMD packed float.

SUMMARY OF THE INVENTION

The present invention comprises a method and apparatus for converting a packed integer data item having first and second data elements, to a packed floating-point data item. A method includes moving the first data element of the integer data item to a first element of a first intermediate data item and extending a sign of the first data element into all bit positions of a second data element of the first intermediate data item. The second data element of the integer data item is moved to a first data element of a second intermediate data item and a sign of the second data element is extended into all bit positions of a second data element of the second intermediate data item. The method then converts the first and second intermediate data items from integer data items to respective floating-point data items, and packs the first and second intermediate floating-point data items to first and second data elements of a result.

DETAILED DESCRIPTION

The present invention comprises a method and apparatus for converting a packed integer data item to a packed floating-point data item. In one embodiment, a method comprises moving a first data element of the integer data item to a first data element of a first intermediate data item and extending a sign of the first data element into all bit positions of a second data element of the first intermediate data item. The method further includes moving a second data element of the integer data item to a first data element of a second intermediate data item and extending a sign of the second data element into all bit positions of a second data element of the second intermediate data item. The first and second intermediate data items are converted from integer data items to respective floating-point data items, and the first and second intermediate floating-point data items are packed to first and second data elements of a result.

Figure 2:
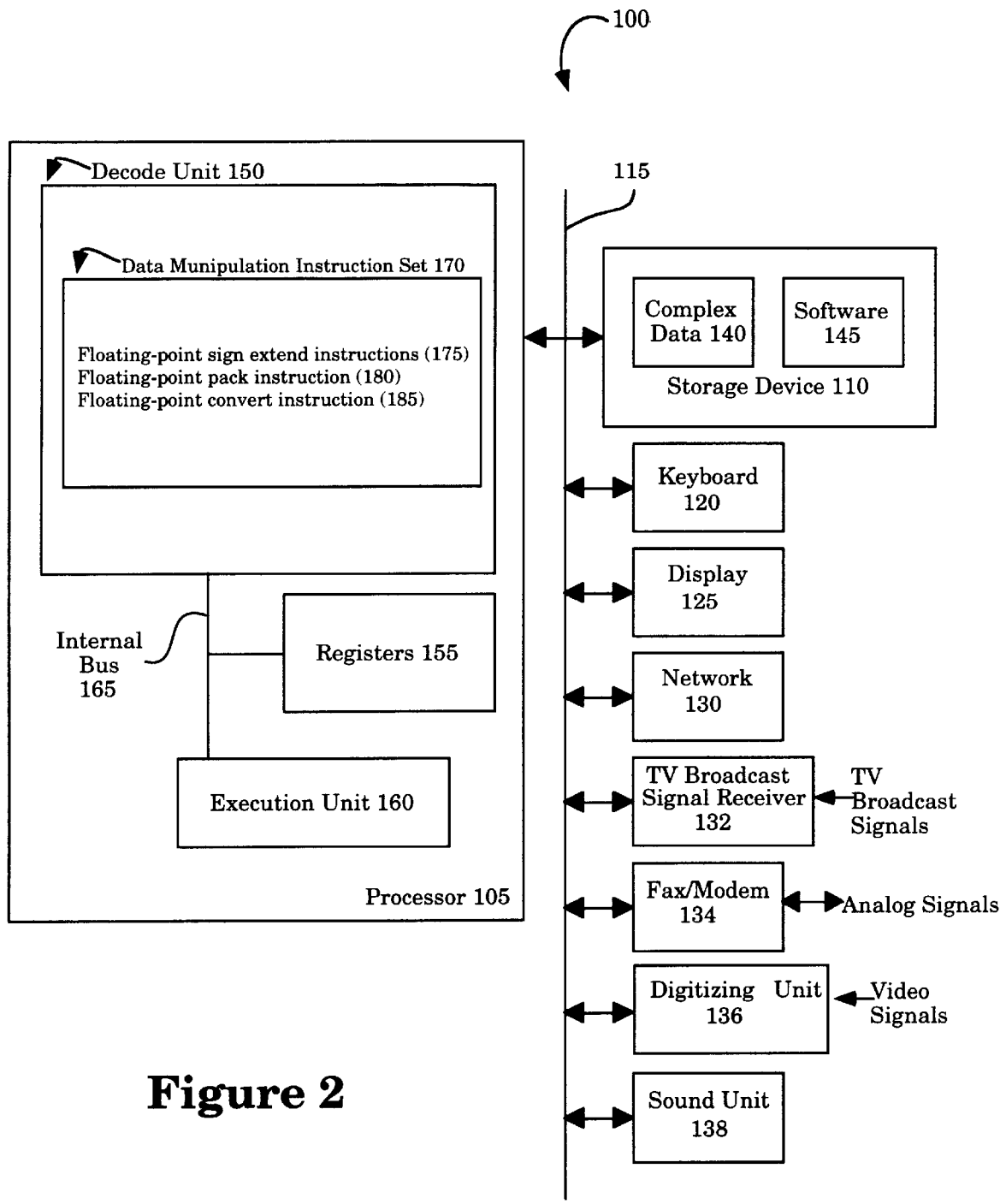
FIG. 2 shows a block diagram illustrating an exemplary computer system according to one embodiment of the invention.

FIG. 2 shows a block diagram illustrating an exemplary computer system 100 according to one embodiment of the invention. The exemplary computer system 100 includes a processor 105, a storage device 110, and a bus 115. The processor 105 is coupled to the storage device 110 by the bus 115. In addition, a number of user input/output devices, such as a keyboard 120 and a display 125 are also coupled to the bus 115. The processor 105 represents a central processing unit of any type of architecture, such as a CISC, RISC, VLIW, or hybrid architecture. In addition, the processor 105 could be implemented on one or more chips. The storage device 110 represents one or more mechanisms for storing data. For example, the storage device 110 may include read only memory ("ROM"), random access memory ("RAM"), magnetic disk storage mediums, optical storage mediums, flash memory devices, and/or other machine-readable mediums. The bus 115 represents one or more busses (e.g., PCI, ISA, X-Bus, EISA, VESA, etc.) and bridges (also termed as bus controllers). While this embodiment is described in relation to a single processor computer system, the invention could be implemented in a multiprocessor computer system. In addition, while this embodiment is described in relation to a 64-bit computer system, the invention is not limited to a 64-bit computer system.

In addition to other devices, one or more of a network 130, a TV broadcast signal receiver 132, a fax/modem 134, a digitizing unit 136, and a sound unit 138 may optionally be coupled to bus 115. The network 130 represents one or more network connections (e.g., an Ethernet connection), the TV broadcast signal receiver 132 represents a device for receiving TV broadcast signals, and the fax/modem 134 represents a fax and/or modem for receiving and/or transmitting analog signals representing data. The digitizing unit 136 represents one or more devices for digitizing images (e.g., a scanner, camera, etc.). The sound unit 138 represents one or more devices for inputting and/or outputting sound (e.g., microphones, speakers, magnetic storage devices, optical storage devices, etc.)

FIG. 2 also illustrates that the storage device 110 has stored therein floating-point data 140 and software 145. Software 145 represents the necessary code for performing any and/or all of the techniques described with reference to FIGS. 3A, 3B, 4, 5, and 6. Of course, the storage device 110 preferably contains additional software (not shown), which is not necessary to understanding the invention.

FIG. 2 additionally illustrates that the processor 105 includes a decode unit 150, a set of registers 155, an execution unit 160, and an internal bus 165 for executing instructions. Of course, the processor 105 contains additional circuitry, which is not necessary to understanding the invention. The decode unit 150, registers 155, and execution unit 160 are coupled together by internal bus 165. The decode unit 150 is used for decoding instructions received by processor 105 into control signals and/or microcode entry points. In response to these control signals and/or microcode entry points, the execution unit 160 performs the appropriate operations. The decode unit 150 may be implemented using any number of different mechanisms (e.g., a look-up table, a hardware implementation, a PLA, etc.).

The decode unit 150 is shown including a data manipulation instruction set 170 for performing operations on packed data. In one embodiment, the data manipulation instruction set 170 includes floating-point sign extend instructions ("FSXT") 175, a floating-point pack instruction ("FPACK") 180, and a floating-point convert ("FCVT") instruction 185. The operation of each of these instructions is further described herein. While the FSXT and FPACK instructions can be implemented to perform any number of different operations, in one embodiment they operate on packed instructions. Furthermore, in one embodiment, the processor 105 is a pipelined processor (e.g., the Pentium® II processor) capable of completing one or more of these data manipulation instructions per clock cycle (ignoring any data dependencies and pipeline freezes). In addition to the data manipulation instructions, processor 105 can include new instructions and/or instructions similar to or the same as those found in existing general purpose processors. For example, in one embodiment the processor 105 supports an instruction set which is compatible with the Intel® Architecture instruction set used by existing processors, such as the Pentium® II processor. Alternative embodiments of the invention may contain more or less, as well as different, data manipulation instructions and still utilize the teachings of the invention.

The registers 155 represent a storage area on processor 105 for storing information, including control/status information, integer data, floating point data, and packed data. It is understood that one aspect of the invention is the described data manipulation instructions for operating on packed data. According to this aspect of the invention, the storage area used for storing the packed data is not critical. The term data processing system is used herein to refer to any machine for processing data, including the computer system(s) described with reference to FIG. 2.

The term operand as used herein refers to the data on which an instruction operates. Additionally, all data elements and operands that begin with the letter "I" represent integer values and all data elements and operands that being with the letter "F" represent floating-point values. For sake of clarity and illustration of the present invention, each register comprises a sixty-four-bit register, unless otherwise specified. However, it must be noted that the registers may comprise any number of bits.

Figure 3A:
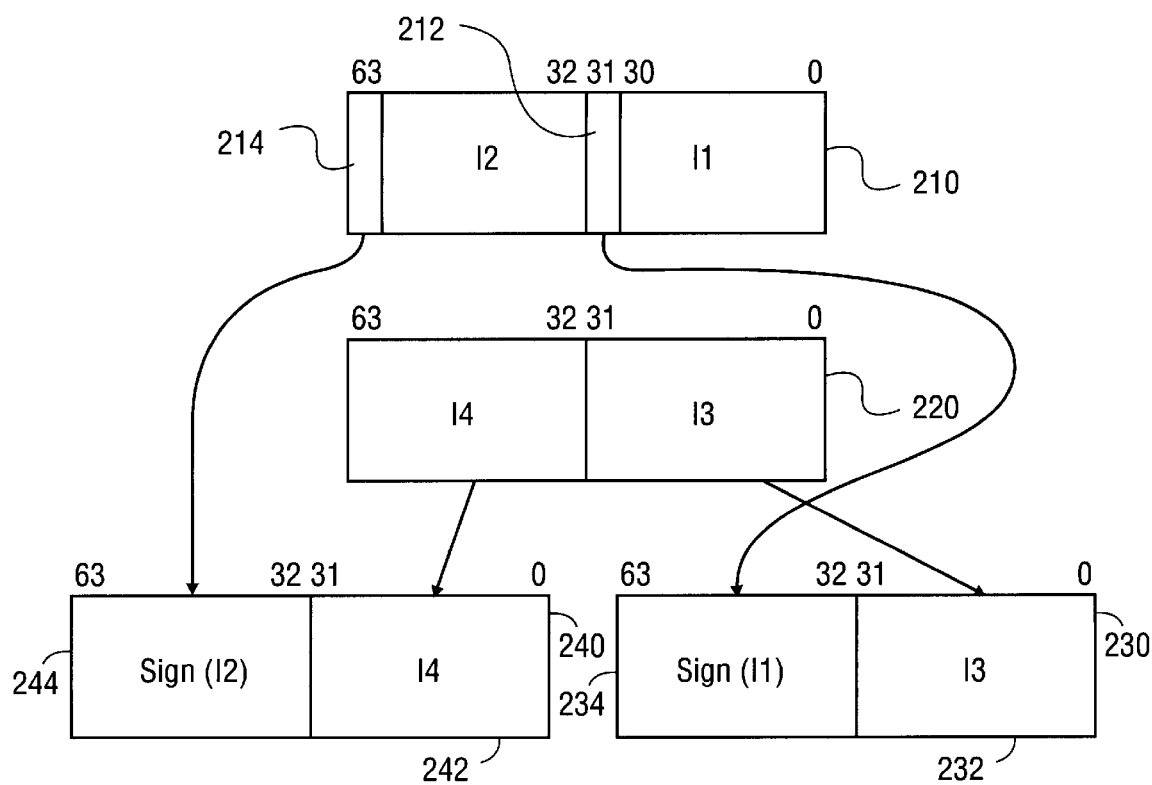
FIG. 3A illustrates the operation of a first data manipulation instruction according to one embodiment of the present invention.

FIG. 3A illustrates the operation of a first data manipulation instruction according to one embodiment of the present invention. FIG. 3A shows, in a simplified format, the operation of floating-point, sign extend right ("FSXTR") and left ("FSXTL") instructions on a first operand 210 and a second operand 220. These floating-point instructions operate on operands located in floating-point registers and/or memory. The first operand 210 is a packed data item containing I2 and I1 as its data elements, while the second operand 220 is a packed data item containing I4 and I3 as its data elements.

The described embodiment of the FSXTR instruction places the right data element I3 of the second operand 220 (bits 0–31) into a first data element 232 of a result 230 (bits 0–31), and places the sign bit 212 of data element I1 of the first operand 210 (bit 31) into all bit positions of a second data element 234 of the result 230 (bits 32–63). Correspondingly, the FSXTL instruction places the data element I4 of the second operand 220 (bits 32–63) into a first data element 242 of a result 240 (bits 0–31), and places the sign bit 214 of the data element I2 of the first operand 210 (bit 63) into all bit positions of a second data element 244 of the result 240 (bits 32–63).

Figure 3B:
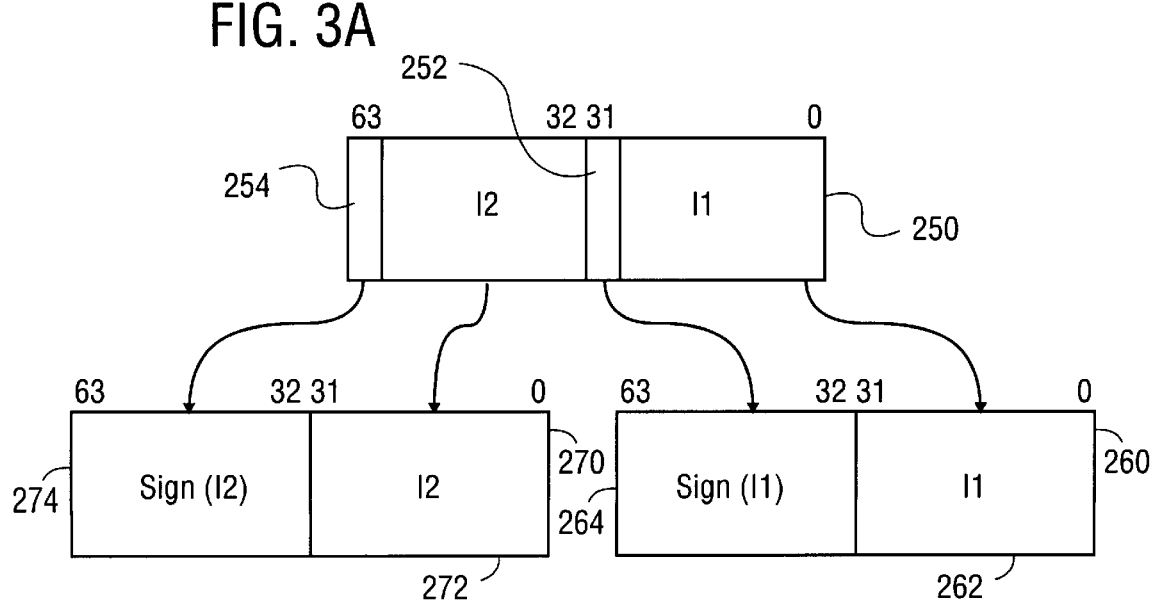
FIG. 3B illustrates the operation of the first data manipulation instruction according to another embodiment of the present invention.

FIG. 3B illustrates the operation of the first data manipulation instruction according to another embodiment of the present invention. Referring to FIG. 3B, the operation of the floating-point, FSXTR and FSXTL instructions on a single operand 250 may be seen. The operand 250 is a packed data item containing I1 and I2 as its data elements.

In this embodiment, where there is only one operand, the FSXTR instruction places the right data element I1 of the operand 250 (bits 0–31) into a first data element 262 of a result 260 (bits 0–31), and places the sign bit 252 of data element I1 (bit 31) into all bit positions of a second data element 264 of the result 260 (bits 32–63). Correspondingly, the FSXTL instruction places the data element I2 of the operand 250 (bits 32–63) into a first data element 272 of a result 270 (bits 0–31), and places the sign bit 254 of the data element I2 of the operand 250 into all bit positions of a second data element 274 of the result 270 (bits 32–63).

Figure 4:
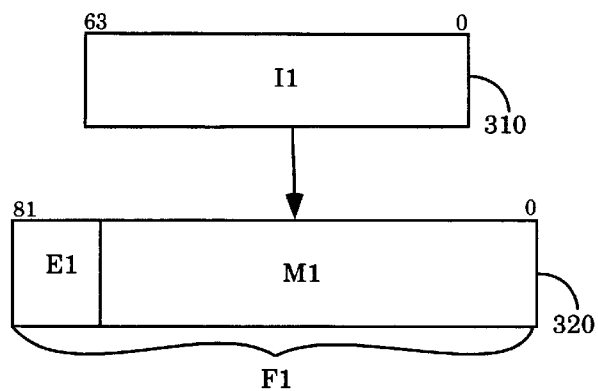
FIG. 4 illustrates the operation of a floating-point convert instruction according to one embodiment of the present invention.

FIG. 4 illustrates the operation of a floating-point convert instruction according to one embodiment of the invention. In this illustration, the FCVT instruction converts a data element, located in a floating-point register, from an integer representation to a floating-point representation. Referring to FIG. 4, a first operand 310 storing an integer data element I1 (bits 0–63) is converted to a second operand 320 storing a floating-point data element F1. The floating-point data element F1 comprises a mantissa M1 and an exponent E1 as its components. Unpacked floating-point values, when stored in registers, are expressed in extended precision data format (82 bits). However, in the case of a packed floating-point value having first and second data elements, each data element is stored in the floating-point register as single precision format (32 bits) to occupy bits 0–63 of the floating-point register. In such a case, the highest order bits (bits 64–81) of the floating-point register are ignored. When a floating-point value is stored in memory, it is stored as a single precision format (32 bits), double precision format (64 bits), double extended precision format (80 bits), etc., depending on its definition. As opposed to the FSXTR and FSXTL instructions, which operate on packed data, the FCVT instruction operates on scalar data, i.e., a single data element per data item.

Figure 5:
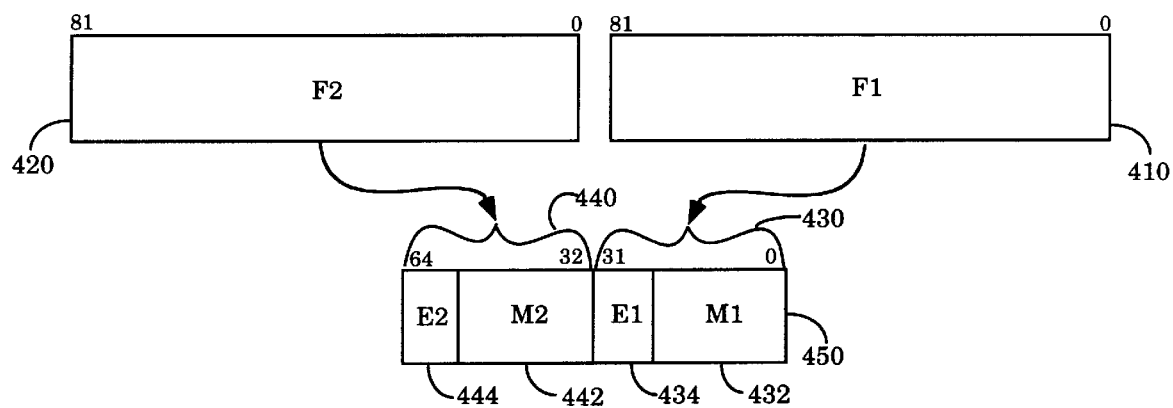
FIG. 5 illustrates the operation of a floating-point pack instruction according to one embodiment of the invention.

FIG. 5 illustrates the operation of a floating-point pack instruction according to one embodiment of the invention. In this embodiment, the FPACK instruction packs data elements from two operands into a result having two data elements. More specifically, a first data element F1 in a first register 410 (bits 0–81) and a second data element F2 in a second register 420 represent floating-point values in extended precision format. The first and second data elements F1 and F2 are packed into first and second data elements 430 and 440, respectively, in a result 450. The first data element 430 (bits 0–31) comprises a mantissa M1 and an exponent E1, and the second data element 440 (bits 32–63) comprises a mantissa M2 and an exponent E2. Each data element in the result 450 is represented in single-precision format. Thus, the FPACK instruction packs two extended precision floating-point data elements F1 and F2 into a single result (64 bits) having two floating-point, single precision data elements.

Figure 6:
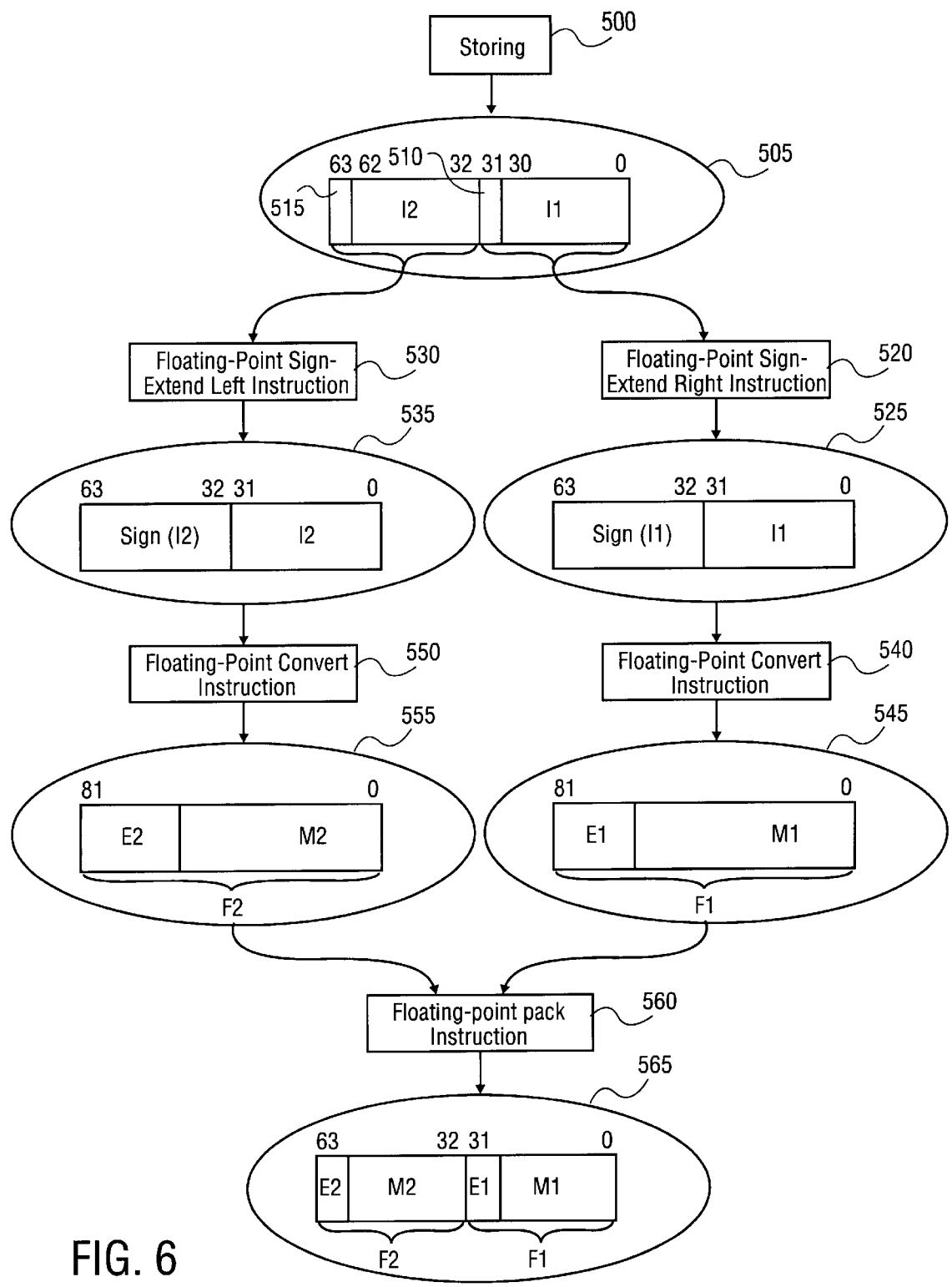
FIG. 6 illustrates an efficient technique for converting a SIMD packed integer data item to a SIMD packed floating-point data item according to one embodiment of the present invention.

FIG. 6 illustrates an efficient technique for converting a SIMD packed integer data item to a SIMD packed floating-point data item according to one embodiment of the present invention. In particular, the technique illustrated in FIG. 5 utilizes a combination of the FSXTR and FSXTL instructions, FCVT instruction, and FPACK instruction to convert a SIMD packed integer data item to a SIMD packed floating-point data item. In this illustration, data is represented by ovals, while instructions are represented by rectangles.

At block 500, a first data element I1 and a second data element I2 are stored in a packed data item 505. The first and second data elements I1 and I2 each represent an integer value. Of course, one or both of these numbers could be imaginary numbers. In such situations, the imaginary number(s) would be stored in a complex format by, for example, storing a real component in a first data element of a data item and storing an imaginary component in a second data element of a data item.

At block 520, a FSXTR instruction is performed on the first data element I1 of the packed data item 505 to generate a first intermediate data item 525. The first intermediate data item 525 contains a first data element (bits 0–31) storing the first data element I1 of the packed data item 505, and a second data element (bits 32–63) storing a sign of the first data element 510 of the packed data item 505 in all bit positions. Analogously, at block 530 a FSXTL instruction is performed on the second data element I2 of the packed data item 505 to generate a second intermediate data item 535. The second intermediate data item 535 contains a first data element (bits 0–31) storing the second data element I2 of the packed data item 505, and a second data element (bits 32–63) storing a sign of the second data element 515 of the packed data item 505 in all bit positions.

At block 540, a FCVT instruction is performed on the first intermediate data item 525 to generate a third intermediate data item 545, containing a floating-point data item F1 in extended precision format (82 bits). The floating-point data item F1 comprises a mantissa M1 and an exponent E1. Furthermore, at block 550, a FCVT instruction is also performed on the second intermediate data item 535 to generate a fourth intermediate data item 555, containing a floating-point data item F2 in extended precision format (82 bits). The floating-point data item F2 comprises a mantissa M2 and an exponent E2.

At block 560, a FPACK instruction is performed on the third and fourth intermediate data items 545 and 555 to generate a resulting packed data item 565. The resulting packed data item 565 contains a first data element storing the floating-point data item F1 in single precision format (bits 0–31), and a second data element storing the floating-point data item F2 in single precision format (bits 32–63).

Figure 1:
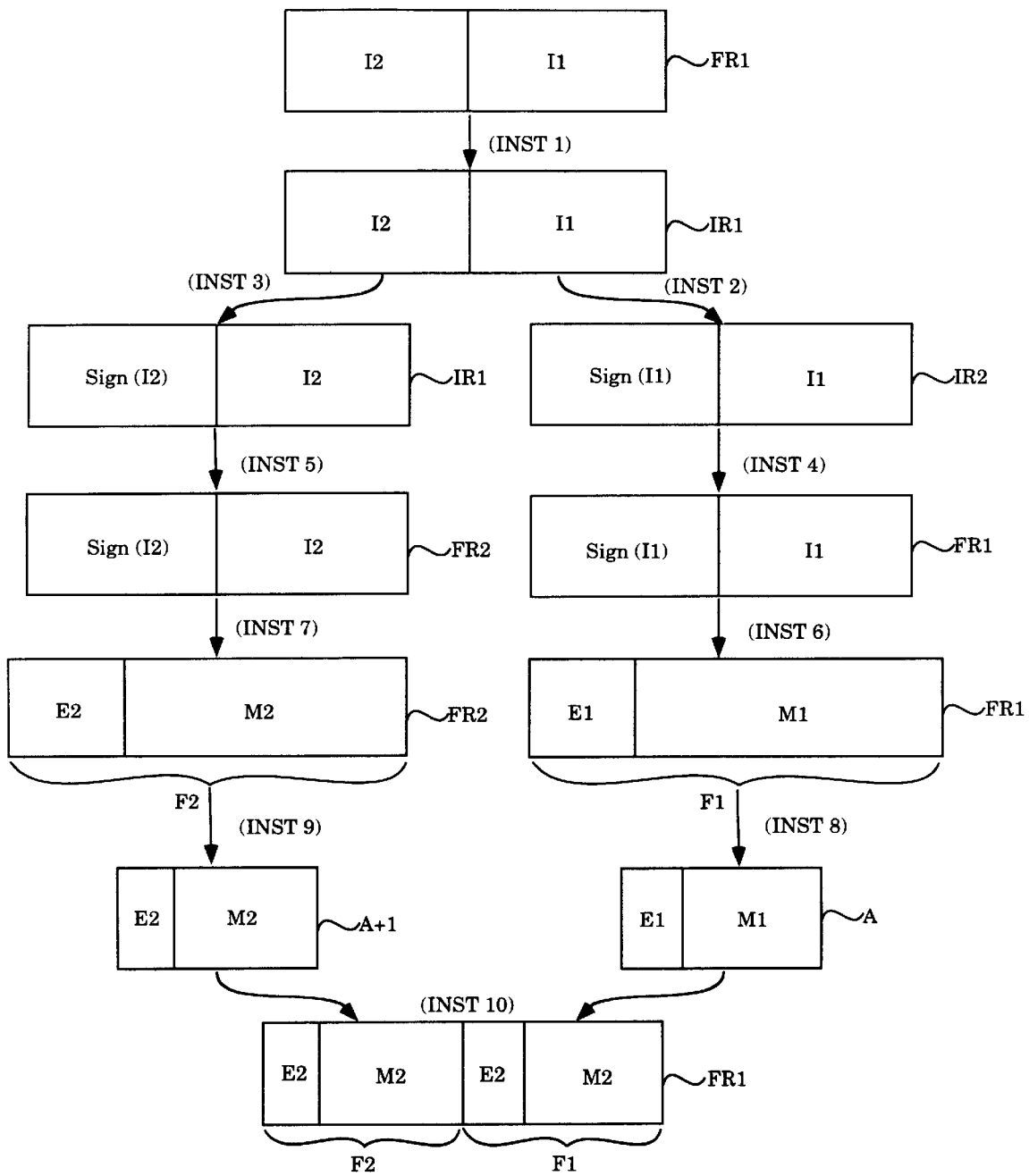
FIG. 1 illustrates a conventional technique of converting a SIMD packed integer data item to a SIMD packed floating-point data item.

Thus, by using the FSXTNR and FSXTNL instructions (blocks 520 and 530), the FCVT instruction twice (blocks 540 and 550), and a FPACK instruction (block 560), a SIMD packed integer data item is converted to a SIMD packed floating-point data item. This provides a significant performance advantage over prior art techniques. For example, the prior art technique described in FIG. 1 require ten instructions, three of which are memory instructions, to convert a SIMD packed integer to a SIMD packed float. Of course, the advantages of this invention are greater when many such operations are performed. The techniques taught by the present invention allow floating-point data elements to be executed in parallel, thereby significantly improving the performance of applications.

The block 500 of storing represents a variety of ways of storing the packed data item 505 in the appropriate format. For example, the packed data item may already be stored on a CD-ROM (represented by the storage device 110) in the described formats. In which case, block 500 may be performed by copying the packed data item from the CD-ROM into the main memory (also represented by the storage device 110), and then into registers 155 on the processor 105. As another example, the fax/modem 134 and/or the network 130 (see FIG. 1) may receive data items in packed format and store them in main memory. The packed data items stored may then be accessed and copied into registers on the processor 105 (e.g., the processor 105 can access a packed data item in a single instruction). Since the data is stored in the disclosed formats, the processor 105 can easily and efficiently convert SIMD packed integer data items to SIMD packed floating-point data items.

In the embodiments illustrating the present invention, the processor 105, executing the FSXTR, FSXTL, and FPACK instructions, operated on packed data in "packed double word" format, i.e., two data elements per operand or register. However, it is to be appreciated that the processor 105 can operate on packed data in other different packed data formats. For example, in one embodiment, packed data can be operated on in a "packed byte" format, a "packed word" format, a "packed quad word" format, and the like. The packed byte format includes eight separate 8-bit data elements, the packed word format includes four separate 16-bit data elements, and the packed quad word format includes one 64-bit data element. While certain instructions are discussed with reference to one or two packed data formats, the instructions may be similarly applied the other packed data formats of the invention.

The technique described in the present invention may be used in three-dimensional graphics and multimedia algorithms for enhancing efficiency of data calculations. For example, many multimedia algorithms execute the same operation(s) on a large number of data elements. These operations include, for example, rendering pixels, calculating angles of pixels, calculating lighting and texture, etc. Pixels are typically represented by data elements that are integer values (e.g., eight, sixteen, thirty-two, etc. bits per pixel). Thus, by packing data elements into data items, the data elements may be operated on in parallel. However, in certain circumstances, such as when a bigger range of numbers is required or angles are involved, the data elements are converted to floating-point data elements. By using the technique of the present invention, packed integer data items are converted into packed floating-point data items efficiently. The packed floating-point data items are then operated on using any number of operations including, but not limited or restricted to, rendering of pixels, blending of surfaces, texturing, lighting, rotating, and the like. Once the operations are performed, the packed floating-point data items, which represent pixels, are optionally converted to integer data items, and then output to the display for viewing. The technique of the present invention may also be used in joint photographic experts group ("JPEG") and motion picture experts group ("MPEG") applications including, for example, image compression.

While certain exemplary embodiments have been described and shown in the accompanying drawings, it is to be understood that such embodiments are merely illustrative of and not restrictive on the broad invention. Moreover, it is to be understood that this invention not be limited to the specific constructions and arrangements shown and described, since various other modifications may occur to those ordinarily skilled in the art.

What is claimed is:

1. A computer implemented method of converting a packed integer data item to a packed floating-point data item comprising:

in response to a first instruction, moving a first data element of the packed integer data item to a first data element of a first intermediate data item and extending a sign of the first data element of the packed integer into all bit positions of a second data element of the first intermediate data item;

in response to a second instruction, moving a second data element of the packed integer data item to a first element of a second intermediate data item and extending a sign of the second data element of the packed integer into all bit positions of a second data element of the second intermediate data item;

in response to a third instruction, converting the first intermediate data item from integer data to floating-point data;

in response to a fourth instruction, converting the second intermediate data item from integer data to floating-point data; and in response to a fifth instruction packing the first and second intermediate floating-point data items to first and second data elements of a result.

2. The method of claim 1 wherein moving the first data element comprises moving the first data element of the integer data item to lower order bits of a first storage area and extending a sign of the first data element into all higher order bit positions of the first storage area.

3. The method of claim 1 wherein moving the second data element comprises moving the second data element of the integer data item to lower order bits of a second storage area and extending a sign of the second data element into all higher order bit positions of the second storage area.

4. A computer system, comprising:

a storage device having stored therein one or more instructions; and a processor coupled to the storage device, the processor, in response to the one or more instructions, to, create a first intermediate data item by moving a first integer data element of a packed integer data item to a first data element of a first floating-point register and extending a sign of the first integer data element into a second data element of the first floating-point register, create a second intermediate data item by moving a second integer data element of the packed integer data item to a first data element of a second floating-point register and extending a sign of the second integer data element into a second data element of the second floating-point register, convert the first and second intermediate data items to a first and second floating-point data items, and pack the first and second floating-point data items from the first and second floating-point registers directly to a single floating-point register.

5. The computer system of claim 4 wherein the storage device is a non-volatile memory element.

6. The computer system of claim 4 wherein the storage device is a volatile memory element.

7. The computer system of claim 4 wherein the storage device is a magnetic storage medium.

8. The computer system of claim 4 wherein the storage device is a CD-ROM.

9. A processor, comprising:

a decoder to decode instructions; and a circuit coupled to said decoder, said circuit in response to one or more decoded instructions to, create a first intermediate data item by moving a first integer data element of a packed integer data item to a first data element of a first floating-point register and extending a sign of the first integer data element into a second data element of the first floating-point register, create a second intermediate data item by moving a second integer data element of the packed integer data item to a first data element of a second floating-point register and extending a sign of the second integer data element into a second data element of the second floating-point register, convert the first and second intermediate data items to a first and second floating-point data items, and pack the first and second floating-point data items from the first and second floating-point registers directly to a single floating-point register.

10. The method of claim 9 wherein the first storage area is a register.

11. The method of claim 10 wherein the register is a sixty-four bit register.

12. A computer implemented method of converting a packed integer data to a packed floating-point data comprising:

storing in a first floating-point register the result of,
extending a sign of a first integer data element of the packed integer data, and
concatenating the first integer data element with the extended sign of the first integer data element;

storing in a second floating-point register the result of,
extending a sign of a second integer data element of the packed integer data, and
concatenating the second integer data element with the extended sign of the second integer data element;

converting the integer data in the first-floating point register to floating-point data;

converting the integer data in the second-floating point register to floating-point data; and packing the floating-point data of the first and second floating-point register directly into a single floating-point register.

13. The method of claim 12 wherein the storing in a first floating-point register is performed in response to a single instruction.

14. The method of claim 12 wherein the storing in a second floating-point register is performed in response to a single instruction.

15. The method of claim 12 wherein the first or second floating-point registers can be the single floating-point register.

* * * * *